(No Model.)
2 Sheets—Sheet 1.
J. DUCKER.
FEEDER FOR THRASHING MACHINES.
No. 267,066.
Patented Nov. 7, 1882.
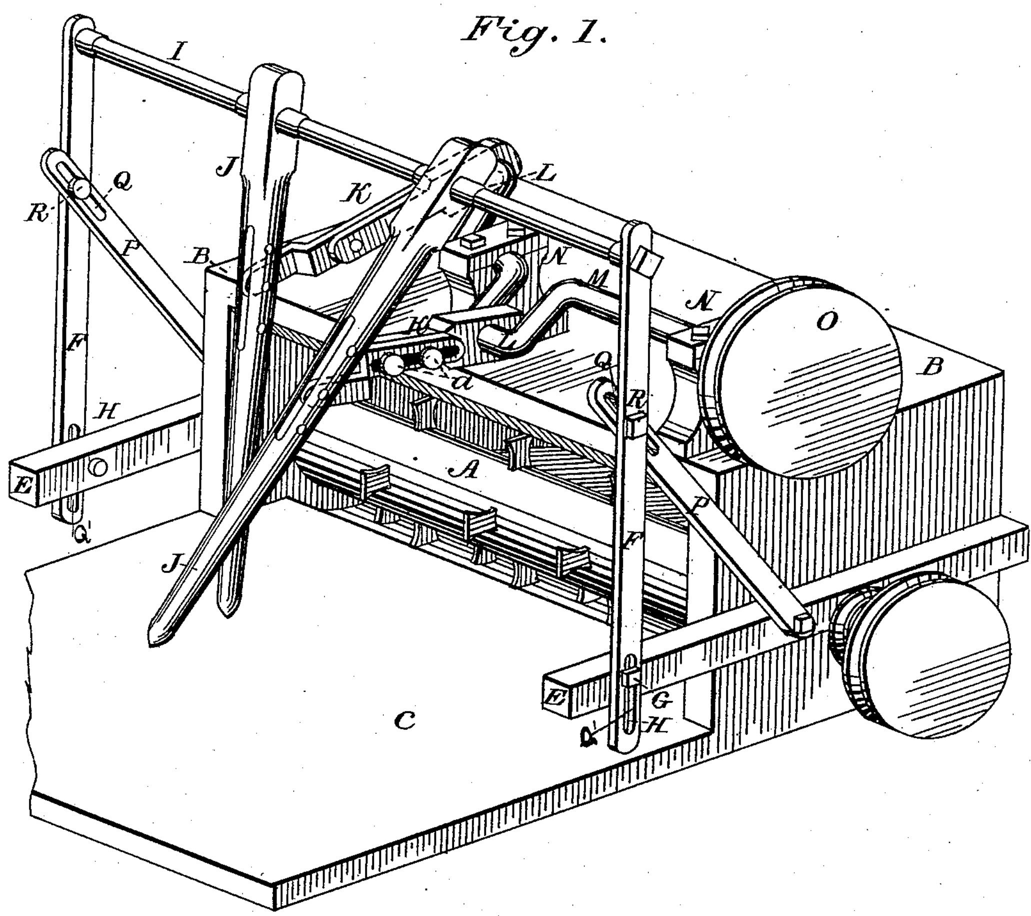
Witnesses,
Geo. H. Strong.
S. H. Nourse
Inventor
John Ducker
By Dewey & Co
Attorneys
N. PETERS, Photo-Lithographer, Washington, D. C.

(No Model.)
2 Sheets—Sheet 2.
J. DUCKER.
FEEDER FOR THRASHING MACHINES.
No. 267,066. Patented Nov. 7, 1882.
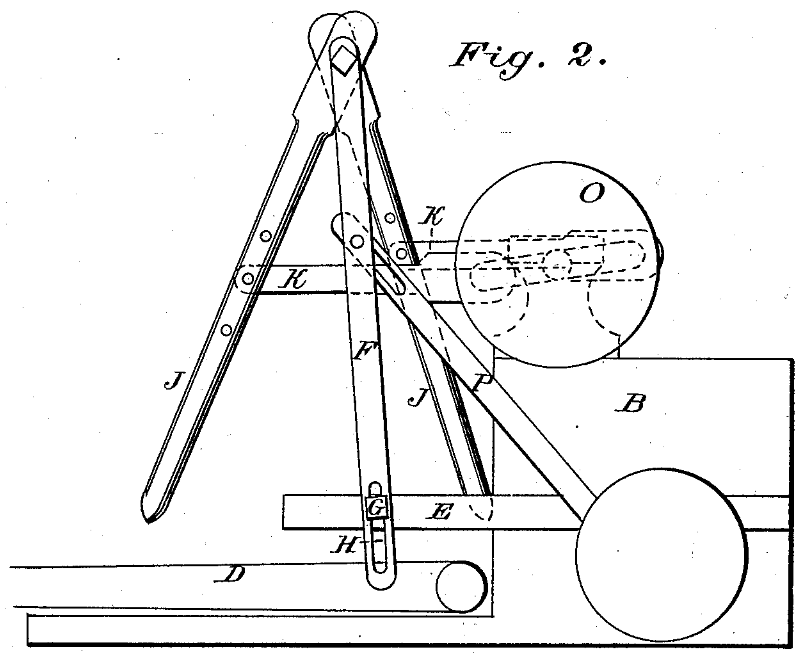
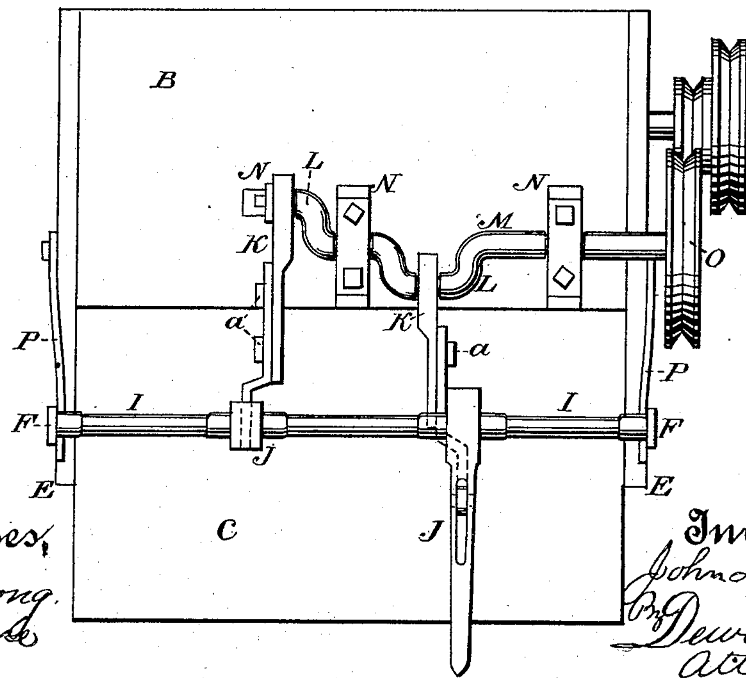
Witnesses,
Geo. H. Strong.
S. H. Nourse
Inventor
John Ducker
By Dewey & Co
Attorneys
N. PETERS, Photo-Lithographer, Washington, D. C.

UNITED STATES PATENT OFFICE.

JOHN DUCKER, OF SANTA ROSA, CALIFORNIA.

FEEDER FOR THRASHING-MACHINES.

SPECIFICATION forming part of Letters Patent No. 267,066, dated November 7, 1882.

Application filed August 26, 1882. (No model.)

*To all whom it may concern:*

Be it known that I, JOHN DUCKER, of Santa Rosa, county of Sonoma, State of California, have invented an Improved Feeder for Thrashing-Machines; and I hereby declare the following to be a full, clear, and exact description thereof.

My invention relates to a device for feeding unthrashed straw to the cylinder of a thrashing-machine and regulating the same; and it consists in certain details of construction, as hereinafter fully described, and specifically pointed out in the claims.

The essential part of my invention lies in the adjustment of the frame of the arm-supporting shaft forward and back and up and down, and in a corresponding adjustment of the connecting-rods, so that wet, green, or dry straw may be fed with equal facility.

Referring to the accompanying drawings for a more complete explanation of my invention, Figure 1 is a perspective view of my apparatus. Fig. 2 is a side elevation. Fig. 3 is a plan or top view.

A is the cylinder of a thrashing-machine, and B the inclosing case or cap.

C is the feed board or table, opening into the throat of the cylinder, and D is the draper or carrying-belt, which is employed to convey the straw to the thrasher in the usual manner.

Timbers E are fixed to project upon each side of the feed-belt D; or the frame-timbers themselves may serve to support the standards F, which are secured by bolts G passing through slots H in the lower ends of the standards. The upper ends of these standards receive the journals of a shaft, I, which extends across above the feed table or belt, and but a short distance in front of the cylinder. It has the arms J fixed to it, two or more being employed, according to the width of the machine. These arms are preferably made of wood, with blunt or rounded points which extend down near the belt. These arms are slotted at points below the shaft I, and have connecting-rods K adjustably united to them at these points. The connecting-rods extend back to cranks L upon a shaft, M, which rotates in boxes N upon the top of the machine, as shown. A pulley, O, upon the end of the shaft is driven by a belt from a pulley upon any convenient or suitable shaft upon the machine which will give the requisite speed. The connecting-rods are jointed, slotted, and provided with set-screws *a*, so that they may be lengthened or shortened at will.

From the sides of the machine braces P extend up, and are bolted to the standards F, both the braces and the standards being slotted, as shown at Q and Q′. By thus slotting the standards, and also the braces, the standards may be tilted forward or back, and thus carry the shaft I to or from the cylinder, where it is fixed at any desired point by set-nuts R.

The action of the reciprocating arms J is modified by adjusting the length of the connecting-rods, and the depth to which the arms J enter the straw will be regulated by raising or lowering the standards F upon the bolts G. The object of these adjustments is to enable me to feed straw in any stage of dryness, and equally well that which is green or wet, the latter being specially difficult on account of its tendency to mat together and clog.

When the straw is dry the standards F may be set comparatively straight, as shown in Fig. 1, and this will cause the arms J to be thrown outward to a considerable distance, and also to swing well up above the straw which is moving forward upon the belt, and which is also being drawn in by the action of these arms, caused by the movement of the oppositely-placed cranks L, and this movement causes arms J to pull the straw apart, and especially to separate any bunches or masses which may arrive, so that they will not pass through the cylinder in that condition. This is principally effected by the pulling apart and pushing away of the straw by the oscillating arms acting against the constant dragging-forward action of the cylinder, and this double action can only take place when the arms J are so set that they swing close into the throat of the cylinder, as shown in my present construction.

I am aware that arms have been supported above a belt or draper which carries straw to a thrashing-cylinder, said arms being caused to swing back and forward simultaneously, and also that a series of arms have been made to operate upon the straw at a considerable distance from the cylinder, and before it has passed within the influence of the latter, and I do not claim such a construction or arrangement. My invention depends for its utility upon the adjustment of the swinging arms J close to the thrashing-cylinder, so that they will act upon the straw which has been seized by the cylinder and is being dragged in by it. Their action is thus, in conjunction with that of the cylinder, to separate and tear the straw apart, and to hold back all that cannot be properly thrashed until it will pass in without clogging.

The adjustment of the shaft I up or down and to or from the cylinder is of great importance, as it regulates the throw of the arms J, so that their ends may be thrown up to a considerable height as they swing away from the cylinder. Their action is mostly dependent upon that of the cylinder, and they will therefore feed equally from a carrying-belt or a feed-table.

Having thus described my invention, what I claim as new, and desire to secure by Letters Patent, is—

1. In combination with the cylinder A of a thrashing-machine, the alternately-swinging arms J, the shaft I, shaft M, having the cranks L, the adjustable rods K, and means for moving said shaft I to or from the cylinder, so as to change the throw of the arms, as set forth.

2. The standards F, having the adjusting-slots H, suitable supports for said standards, bolts G, shaft I, and vibrating arms J, in combination with the slotted braces P and the cylinder A of a thrashing-machine, substantially as and for the purpose described.

In witness whereof I hereunto set my hand.

JOHN DUCKER.

Witnesses:
S. W. METCALF,
F. B. MIZE.